United States Patent [19]

Whitham

[11] Patent Number: 4,568,041
[45] Date of Patent: Feb. 4, 1986

[54] FIN ATTACHMENT

[75] Inventor: Kent G. Whitham, Inyokern, Calif.

[73] Assignee: The United States of America as represented by the Secretary of the Navy, Washington, D.C.

[21] Appl. No.: 591,159

[22] Filed: Mar. 19, 1984

[51] Int. Cl.⁴ ............... F42B 13/30; F42B 15/02; F16B 13/10; B25G 3/28
[52] U.S. Cl. ............... 244/3.25; 244/3.24; 403/258; 403/361
[58] Field of Search ......... 403/260, 258, 361, 262, 403/369, 370, 371, 374, 368; 279/8; 244/3.24, 3.25, 3.26, 3.27, 3.28, 2.29, 3.30, 91; 29/525

[56] References Cited

U.S. PATENT DOCUMENTS

| | | | |
|---|---|---|---|
| 2,718,155 | 9/1955 | Firth | 74/230.17 |
| 2,811,881 | 11/1957 | Rieser | 74/421 |
| 2,956,826 | 10/1960 | Nord | 287/52 |
| 2,974,965 | 3/1961 | Welles, Jr. | 403/361 |
| 3,011,794 | 12/1961 | Vaugn | 279/76 |
| 3,101,962 | 8/1963 | Nunlist | 287/114 |
| 3,613,221 | 10/1971 | Pronk | 403/361 |
| 4,136,533 | 1/1979 | Okuda | 64/23 |
| 4,172,574 | 10/1979 | Spillman | 244/91 |

*Primary Examiner*—Deborah L. Kyle
*Assistant Examiner*—Michael Carone
*Attorney, Agent, or Firm*—Robert F. Beers; W. Thom Skeer; Stephen J. Church

[57] ABSTRACT

An improved fin attachment having a socket for reception of a tang mounted on a missile fin, an element for drawing the tang into the socket, and frusto-conical concentric rings which engage the tang and the socket to connect them rigidly in a predetermined angular relation. All elements of the attachment are retained so as not to be lost when the fin is detached, and the attachment provides effective connection without the use of complex shapes or precise manufacturing tolerances.

11 Claims, 4 Drawing Figures

FIN ATTACHMENT

BACKGROUND OF THE INVENTION

1. Field of the Invention

The present invention relates to an improved fin attachment and, more particularly, relates to an attachment for detachably connecting a pair of members in predetermined angular relation. Most particularly, the subject invention relates to such an attachment for individually mounting control fins on a missile so that each fin may be repeatedly, quickly, and conveniently attached and detached.

2. Description of the Prior Art

Missiles are commonly provided with fins for aerodynamic guidance. The fins may be fixed when a missile is in flight or may pivot to control the course of the missile. To reduce the bulk of a missile for shipping and storage the fins are not attached until the missile is ready for use. If the missile is not fired, as is often the case in a missile for launching from an aircraft, it is necessary to remove the missile from the aircraft and then to detach each fin before restorage of the missile. The attachment and detachment of each fin often occurs under adverse circumstances, as in the dark on the tossing deck of an aircraft carrier. Nevertheless, the fin must be quickly attachable and detachable and, when attached, be rigidly connected to the missile in predetermined angular relation even though the fin has been previously dismounted and remounted many times. The need for rigidity and precision in mounting is particularly important for control fins in which "flutter" and imprecise angular relation may render a missile guidance system ineffective. It is, of course, undesirable to provide unneccessary openings into the interior of a missile body, so that suitable missile fin attachments must be operable from the exterior of the missile and with limited access to the member on which the fin is mounted.

A number of prior art attachments have been utilized for detachably mounting a missile fin. However, such prior art attachments have one or more difficiencies such as allowing flutter of the fin, having parts which may be lost when a fin is removed, requiring undesirable use of tools, having members which are of unusual shapes or require close tolerances and are expensive to manufacture, or by having members which are easily damaged by carelessness when the fin is mounted and/or eventually damaged even when care is used.

It is known to connect a pair of members in a fixed angular relation by an inner ring and an outer ring having individual and conforming frusto-conical surfaces, the rings being urged together axially so that the outer ring expands against one member while the inner ring contracts against the other member. The rings thus clamp the members in fixed angular relation and yet allow the members to be released when the rings are relaxed. However, insofar as is known to the inventor, such rings have not been used to mount missile fins to a missile body, previous arrangements for using such rings being unsuited for missile fin mountings due to including a multitude of parts which are loose when the members are disconnected and to requiring substantial access to both members while they are being attached or detached.

SUMMARY OF THE INVENTION

It is, accordingly an object of the subject invention to provide an improved fin attachment for connecting a pair of members rigidly and in predetermined angular relation.

Another object is to provide such an attachment wherein the members are quickly and repeatedly connectable and disconnectable without affecting the rigidity of their connection and the accuracy of their positioning when the members are connected.

Another object is to provide such an attachment requiring a minimum use of tools.

Another object is to provide such an attachment for mounting a fin on a missile and in which there are no parts of the attachment which may become lost when the fin is detached from the missile.

Another object is to provide such an attachment wherein the members are configured so as to be simply and economically manufactured.

BRIEF DESCRIPTION OF THE DRAWINGS

Other objects, advantages, and novel features of the subject invention will become apparent from the following detailed description of the invention when considered in conjunction with the accompanying drawing figures wherein.

DESCRIPTION OF THE PREFERRED EMBODIMENT

First Embodiment

Figure 1:
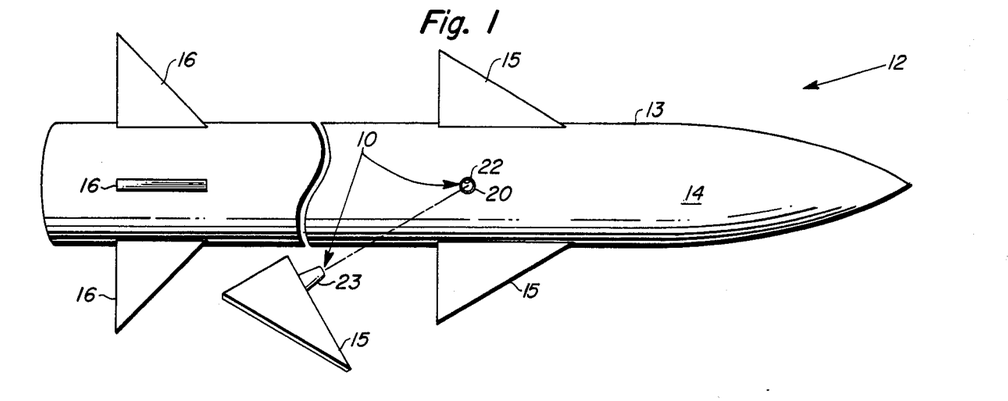
FIG. 1 is a side view of a missile having a fin mounted by an improved fin attachment of the subject invention, the fin being shown detached from the missile.

In FIG. 1 there is shown an improved fin attachment 10 which is a first embodiment of the subject invention. The attachment is depicted in a representative operating environment of a missile 12 having a body 13 providing a skin 14. The missile has four pivotal control fins 15 and four fixed fins 16. The fins are mounted on the body. One of the control fins is shown detached from the missile and as having such an attachment; however, it is to be understood that any or all of the other seven fins may be provided therewith.

Figure 2:
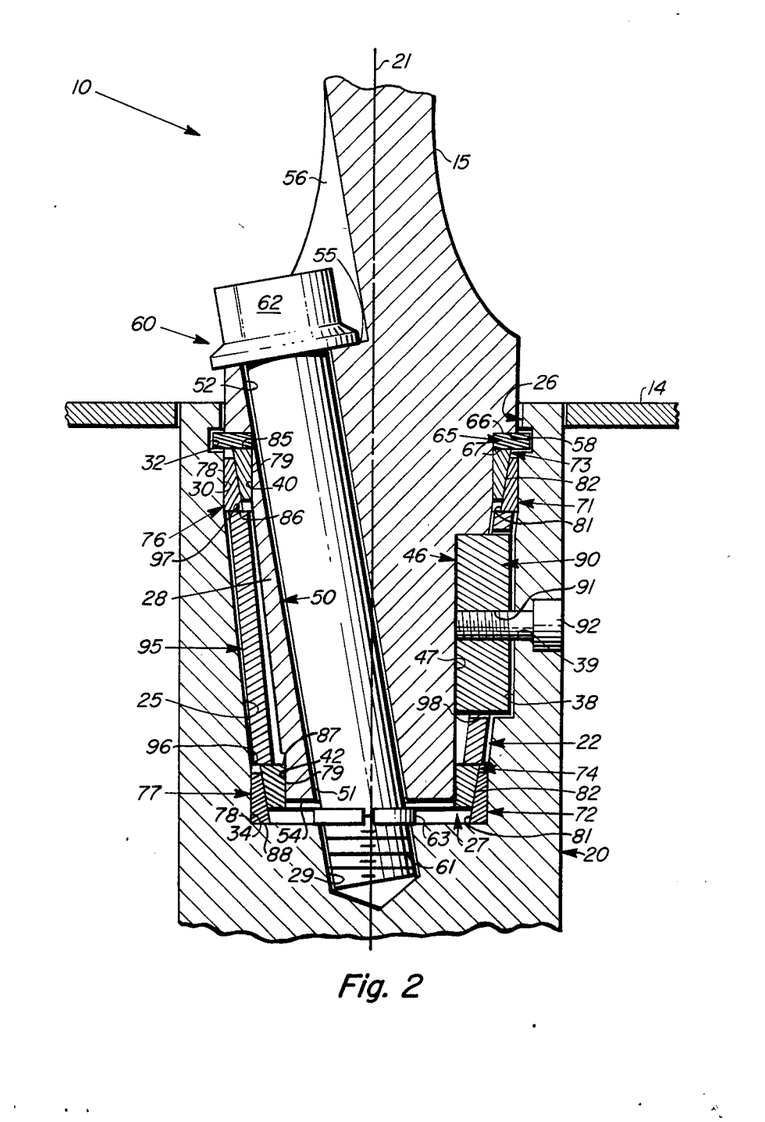
FIG. 2 is a section of a first embodiment of the attachment together with fragmentarily represented portions of the missile.
Figure 3:
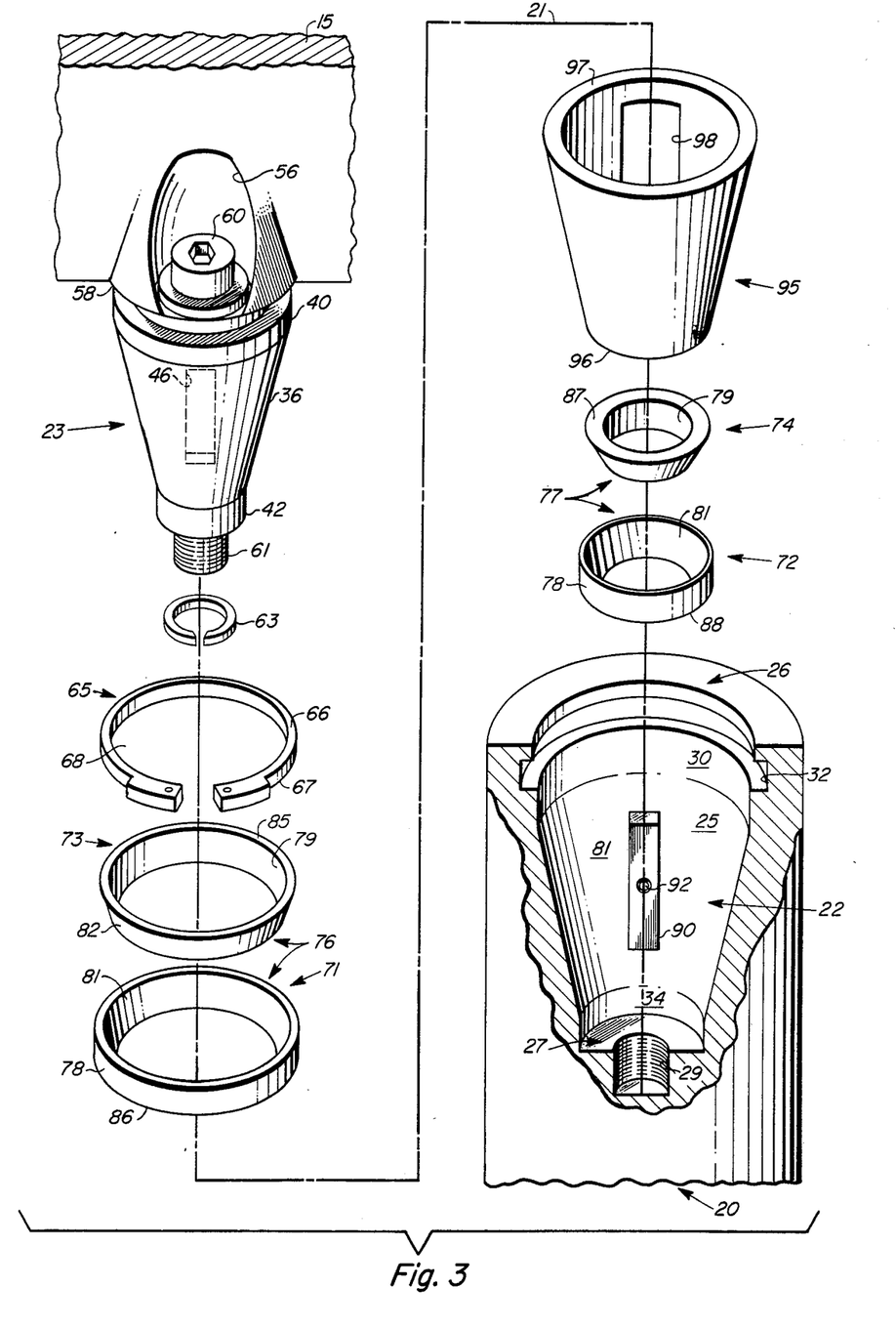
FIG. 3 is an exploded perspective view of the embodiment of FIG. 2.

Referring to FIGS. 1, 2, and 3, attachment 10 is seen to include a hub 20 which is associated with the detached one of the control fins 15 and is permanently mounted in the missile body 13 for pivotal movement relative thereto in any suitable manner about a predetermined line or axis 21 which extends generally normal to the skin. The hub defines a generally circular socket 22 coincident axially with the axis 21. The coupling includes a projection or tang 23 which is receivable in the socket by movement theretoward along the axis and is removable from the socket by movement in the opposite direction. The tang is fixedly mounted on such one fin in any suitable manner and extends therefrom along the axis. As will subsequently be apparent, attachment 10 serves to detachably connect the fin to the hub in a predetermined angular relation thereto about the axis with the fin extended from the body along axis 21, which extends centrally of the tang and is circumscribed by the socket. It is apparent that the fin and the hub are disposed in juxtaposed relation along the axis when connected by attachment 10.

Socket 22 of hub 20 provides an interior surface 25 which has an open, accessible axial end 26 disposed at the skin 14 and which has an opposite closed axial end 27 disposed inwardly of the skin. The closed end is, typically, a planar circular surface normal to the axis 21. The socket is of tapered configuration converging axially in a direction toward closed end 27. Tang 23 is similarly configured so that the tang is receivable in the socket by insertion therein through open end 26 and is removable from the socket by withdrawal of the tang through such end. When tang 23 is fully received in socket 22, the tang has a predetermined position 28 relative thereto along the axis, this position being shown in FIG. 2. The closed end of socket 22 is provided with an internally screw-threaded bore 29 having an axis which is disposed in acute angular relation to the axis 21 and which, typically, intersects the latter axis in the vicinity of closed end 27. Bore 29, for reasons which will subsequently be apparent, lies in a plane generally normal to the corresponding one of the fins 15.

The hub 20 provides a first cylindrical clamping ring surface 30 of the attachment 10. This surface is an outer end cylindrical surface of the socket and extends from open end 26 toward closed end 27 a substantial portion of the distance between these ends. Surface 30 is a portion of the interior surface 25 of the socket 22. The axis of first surface 30 is substantially coincident with the axis 21. This first surface is substantially larger in diameter than closed end 27 for reasons subsequently set forth. Socket 22 provides an annular retaining ring groove 32 coaxially related to surface 30 and extended outwardly therefrom immediately inward, axially, of open socket end 26. Socket 22 provides a second cylindrical clamping ring surface 34 of attachment 10, this surface being an inner end cylindrical surface of the socket and coaxially related to first surface 30. The second surface is equal in diameter to closed end 27, and extends therefrom toward open end 26 a substantial portion of the distance therebetween. Between these cylindrical surfaces the socket has a frusto-conical region 36 which interconnects cylindrical surfaces 30 and 34 and is coaxial therewith. Socket 22 provides a keyway 38 which is elongated in a direction along the axis 21 and, typically, has a rectangular cross section. Longitudinally the keyway is disposed between cylindrical surfaces 30 and 34 and opens centrally of socket 22. The keyway extends for any suitable depth into hub 20 radially of axis 21 and is disposed at any suitable location angularly thereabout. A bore 39, for a purpose which is subsequently described, extends radially through the hub into the keyway and typically, is counterbored at the exterior of hub 20.

Referring now to FIGS. 2 and 3, it is seen that tang 23 bears a third cylindrical clamping ring 40 surface of attachment 10, this surface being an outer end cylindrical surface of the tang. Surface 40 is an external cylindrical surface, which is substantially coaxially related to first cylindrical surface 30 and is aligned therewith along axis 21 when the tang is in its position 28 relative to socket 22. Third surface 40 is, however, substantially smaller in diameter than first surface 30. Tang 23 bears a fourth cylindrical clamping ring surface 42 of attachment 10. This fourth surface is coaxially related to third surface 40 and is an inner end cylindrical surface of the tang. Fourth surface 42 is substantially smaller in diameter than third surface 40 and second surface 34 and is aligned with surface 34 in a direction along axis 21 when the tang is in position 28. The axes of surfaces 30, 34, and 42 are then substantially coincident with axis 21. Tang 23 has a frusto-conical portion 44 which interconnects the surfaces 40 and 42 and is coaxially related to them so that the tang is of a tapered configuration converging in a direction from surface 40 toward surface 42. The tang has a keyway 46 extended along the axis 21 between surface 40 and surface 42. Keyway 46 is disposed, so that, when hub 20 and the corresponding fin 15 are in a predetermined angular relation and when the tang is in its position 28 relative to the hub, keyway 46 is aligned with keyway 38 of hub 20 and opens toward the hub keyway. The keyways are correspondingly dimensioned and proportioned radially of axis 21. Tang keyway 46 has a planar central surface 47 which is substantially parallel to axis 21 and, radially of this axis, is disposed outwardly of fourth surface 42. The keyway thus opens along axis 21 in a direction toward fourth surface 42.

It is seen that tang 23 has a cylindrical bore or channel 50 extended through it and disposed so that bore 50 is aligned axially with screw-threaded bore 29 of hub 22 when the hub and the corresponding one of the fins 15 are in their predetermined angular relation and when the tang is in its position 28 relative to socket 22. It is apparent that bore 50 is then disposed in angular relation to the axis 21. Bore 50 has a first open end 51 disposed toward closed end 27 of the hub and has an opposite, open second end 52 adjacent to the one fin and disposed at open hub end 26. Tang 23 thus has a first surface 54 disposed centrally of cylindrical surface 42 and disposed toward the closed hub end 27 through which first end 51 opens. Tang 23 has an opposite second surface 55 from which the one fin extends and through which the second end of the bore opens. Typically, first tang surface 54 is normal to axis 21 while second tang surface 55 is planar and is normal to the axis of bore 50 and is disposed at one side of the fin. Second tang surface 55 circumscribes the second end of bore 50 and the associated one of the fins 15, typically, is provided with a recess 56 for access to the second surface. Tang 23 has an annular shoulder 58, which is referred to in the claims as a positioning or clamping surface and which extends coaxially outwardly from third cylindrical surface 40. Shoulder 58 is disposed in a plane which is normal to axis 21 and which intersects groove 32 when tang 23 is in its position 28 relative to hub 20. The outer diameter of shoulder 58 is substantially larger than the diameter of third cylindrical surface 40 but is somewhat less than that of second cylindrical surface 34. It is apparent that shoulder 58 extends radially from the portion of tang 23 which bears third cylindrical surface 40 and fourth cylindrical surface 42.

The attachment 10 has a bolt or tension element 60 extended through bore 50 of tang 23. The bolt is slidably received in this bore and has an externally screw-threaded or socket engaging end portion 61 extending from the tang at end 51 of bore 50 and from first tang surface 54 for screw-threaded engagement with screw threaded bore 29 at closed end 27 of hub 20. Bolt 60 has a head 62 disposed outwardly of bore 50 at end 52 thereof and at second tang surface 65. Bolt head 62 is thus disposed oppositely of the tang 23 from the screw-threaded end portion of the bolt and the closed end of the socket. Head 62 is larger in diameter than the balance of bolt 60 and is thus disposed to engage second tang surface 55 at one side of the corresponding one of the fins 15. Head 62 is configured in any suitable manner for engagement with a corresponding driving tool, not shown, for rotational manipulation of bolt 60. Preferably, the bolt is provided with a snap ring 63 which is of well known construction and which is received in a suitable annular groove in the bolt adjacent to first tang surface 54. This shop ring serves to retain bolt 60 in tang bore 50 when the tang is remote from hub 20.

Attachment 10 includes a retaining ring 65 received peripherally in annular groove 32 of socket 22. Ring 65 thus provides one axially disposed surface 66 facing open end 26 of socket 22 and an opposite such surface 67 facing the closed socket end 27. Retaining ring 65 is of well known construction, being resilient and radially split so that it is compressible for insertion through open hub end 26 and for subsequent expansion into annular groove 32. Ring 65 has a central, generally circular, opening 68 and is dimensioned and proportioned so that, when the ring is expanded within groove 32, the ring is extended radially inwardly therefrom into socket 22. Ring opening 68 is somewhat larger in diameter than third cylindrical surface 40 and the portion of tang 23 bearing this third surface. Fourth cylindrical surface 42 extends centrally through ring 65 without engagement therewith when tang 23 is inserted into socket 22. However, opening 68 is smaller in diameter than tang shoulder 58 so that the shoulder engages ring surface 66 when the tang is in its position 28 relative to the socket. The axial thickness of retaining ring 65 is substantially less than the width of groove 32, and the periphery of the ring, when retained in this groove, is somewhat less than the diameter of the groove so that the retaining ring is freely movable axially in the groove for a purpose subsequently to be explained.

Attachment 10 has a first clamping ring 71, a second claimping ring 72, a third clamping ring 73, and a fourth clamping ring 74 associated respecively with the first cylindrical clamping surface 30, the second such surface 34, the third such surface 40, and the fourth such surface 42. It is apparent that, in relation to socket 22 when tang 23 is in its position 28 relative thereto, the surfaces 30 and 40 are an outer pair of cylindrical clamping surfaces and surfaces 32 and 34 are an inner pair of cylindrical clamping surfaces. It is also apparent that first ring 71 circumscribes the third ring 73, so that these two rings are a first or axially outer pair 76 of clamping rings disposed radially between cylindrical surfaces 30 and 40. It is evident that second ring 72 circumscribes fourth ring 74 so that these latter two rings are second or axially inner pair 77 of clamping rings disposed radially between surfaces 34 and 42. Rings 71 and 72 are, therefore radially outer rings of the corresponding pairs thereof and have individual cylindrical outer surfaces 78 fitted, respectively, to surfaces 30 and 40 for freely slidable movement relative thereto along axis 21 when such outer rings are not expanded. Rings 73 and 74 are, similarly, radially inner rings of their respective pairs and have individual cylindrical inner surfaces 79 which, respectively, are fitted to surfaces 34 and 42 for such movement when these radially inner rings are not contracted. The first and the second clamping rings have individual interior frusto-conical surfaces 81, and the third and the fourth clamping rings have individual exterior frusto-conical surfaces 82. These frusto-conical surfaces converge in a direction along axis 21 from open socket end 26 toward closed socket end 27. The interior and the exterior such surfaces borne by the rings of each of the pairs 76 and 77 thereof conform and are engaged with each other. Since, as before stated, hub surface 30 is larger in diameter than hub surface 34 and tang surface 40 is larger in diameter than tang surface 42, the surfaces 78, 79, 81, and 82 of the outer pair 76 of the clamping rings are larger in diameter than the corresponding surfaces of the inner pair 77 thereof. Pairs of rings suitable for the practice of the subject invention are sold under the Trademark "RINGFEDER".

Each of the clamping rings 71 through 74 has a base or axial end surface corresponding to the smaller diameter end of the frusto-conical surface, 81 or 82, of the rings. These end surfaces are sometimes identified herein sequentially in a direction from open socket end 26 to closed socket end 27 so that ring 73 bears a first axial end surface 85 diposed toward such open end; ring 71 bears a second axial end surface 86 disposed toward such closed end; ring 74 bears a third axial end surface 87 disposed toward such open end; and ring 73 bears a fourth such axial end surface 88 disposed toward such closed end.

Attachment 10 includes a key 90 elongated in a direction along axis 21 and disposed between the rings of ring pairs 76 and 77. Key 90 extends radially of axis 21 so that a pair of transversely opposite portions of the key are individually received in hub keyway 28 and in tang keyway 46. Key 96 is fitted to the tang keyway 46 for slidable movement thereof longitudinally relative to tang 23. The key has a screw-threaded bore 91 aligned axially with hub bore 39, and the key is fixedly mounted in socket 22 by a screw 92 extended through these bores and screw-threadably engaged with the tang bore. Screw 92 has a head received in the counterbore of hub bore 39 and serves to detachably mount the key on the socket.

Attachment 10 includes a tubular spacer 95 of generally frusto conical configuration which circumscribes frusto-conical portion 44 of tang 24 when the tang is received in socket 22. Spacer 95 is, provided with a rectangular opening 98, extending through it radially of axis 21 and conforming loosely to key 90. Opening 98 is aligned with socket keyway 38, and key 90 extends centrally of socket 22 through the opening of the hub for reception in tang keyway 46 as the tang is inserted into the socket with hub 20 and the corresponding one of the fins 15 in a predetermined angular relation about axis 21. Since spacer 95 is spaced radially from tang 23 and hub 20 and opening 98 conforms loosely to key 90, the spacer is freely movable axially relative to socket 22 and tang 23 when spacer 95 is not restrained by engagement with rings 71 and 74, even though tang 23 is in its position 28 in which the tang is fully received in the socket.

Surface 47 of tang keyway 46 is disposed radially of axis 21 between the axially and radially outer cylindrical surface 40 and the axially and radially inner surface 42 thereof, and key 90 extends to a position radially inward of the outer tang surface and radially outwardly of the inner tang surface. Tang 23 is thus removable from socket 22 and is insertable therein while key 90 remains fixed in the socket by screw 92.

From the foregoing description of the elements of the attachment 10 and of certain relationships between these elements it follows that other relationships, which will be apparent upon reference to FIG. 2, exist when tang 23 is in its position 28 in which it is fully received in socket 22. One such relationship is that closed socket end 27 engages base 88 of second clamping ring 72, positioning this ring along axis 21 with outer surface 78 of this ring in engagement with hub surface 34. As a result, engagement of the frusto-conical surface 81 of ring 72 with the conforming surface 82 of fourth ring 74 positions ring 74 along axis 21 with the inner surface 79 of ring 74 in engagement with the tang surface 42. Since spacer 95 extends between base 87 of ring 74 and base 86 of first clamping ring 71, the spacer positions ring 71 along axis 21 with the outer surface 78 of the ring 71 in engagement with hub surface 30. Since frusto-conical surface 81 of the first ring engages the conforming surface 82 of third clamping ring 73, the third ring is positioned along axis 21 with cylindrical surface 78 of the third ring in engagement with tang surface 40.

Since shoulder 58 of tang 23 is aligned along axis 21 with retaining ring groove 32 in hub 20, this groove extends axially of base 85 of third clamping ring 73 toward open end 26 of hub 20, and this groove is disposed between the open end and the position in which third clamping ring 73 is located as described in the previous paragraph. Central opening 68 of retaining ring 65 has a diameter smaller than the outer diameter of base 85 of third clamping ring 73 and somewhat larger than the inner diameter of this base, so that retaining ring surface 67 faces the base of the third ring for engagement therewith. As a result, when tang 23 is remote from socket 22, ring 65 retains third clamping ring 73 in the socket and the third ring, in turn, retains first clamping ring 71, spacer 95, and clamping rings 72 and 74 of the pair 77 thereof in socket 22. It is evident that the first ring is so retained by engagement of the respective frusto-conical surfaces 82 and 81 of the third ring and of the first ring. When tang 23 is in its position 28 in which it is fully received in socket 22, shoulder 58 of the tang extends radially of axis 21 and is disposed oppositely of base 85 of third ring 73 from first ring 71 so as to position the third ring axially by engagement thereof with the retaining ring oppositely of the first ring.

Second Embodiment

Figure 4:
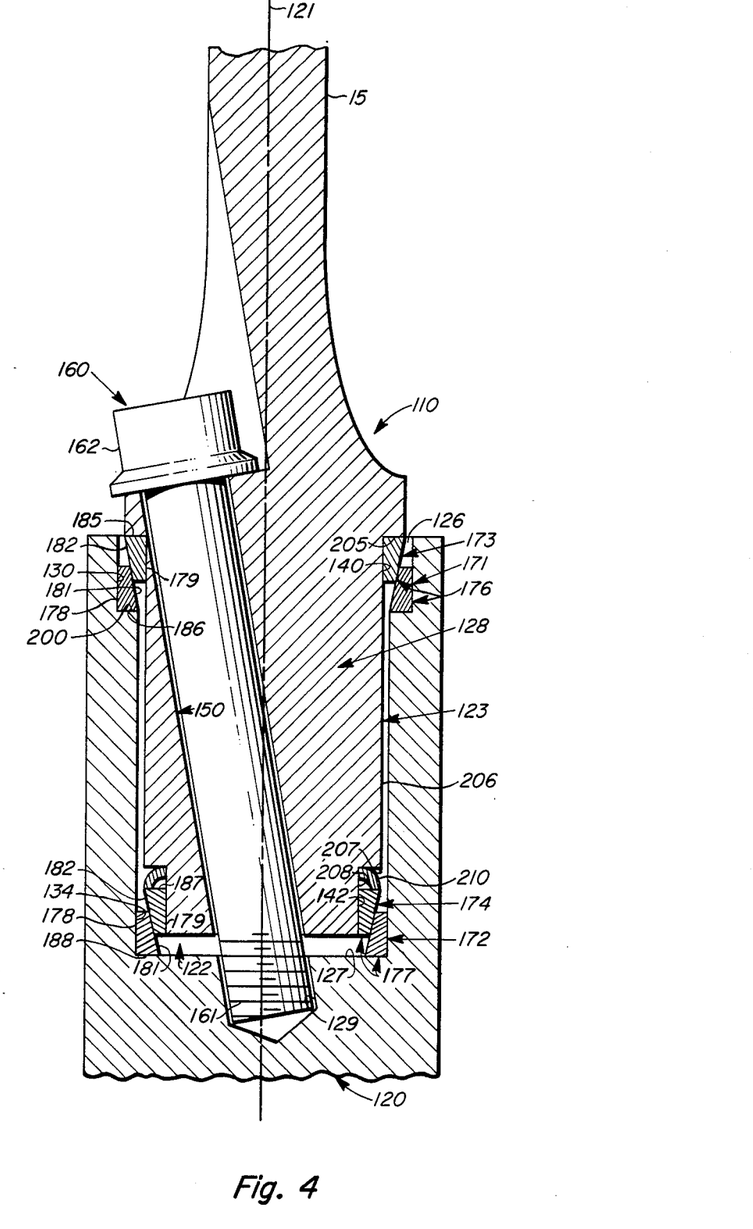
FIG. 4 is a section similar to FIG. 2 showing a second embodiment of the attachment.

In FIG. 4 there is shown an improved fin attachment 110 which is a second embodiment of the subject invention and is to be understood to be used in an operating environment which is similar to that of the attachment 10 of the first embodiment and which also includes a fin 15.

The attachment 110 of the second embodiment includes a hub 120, which has an axis 121 and a socket 122 and has a tang 123 mounted on one of the fins 15 and receivable in the socket and removable therefrom. The fin has a predetermined angular relation about axis 121 in relation to hub 120. Socket 122 as an open end 126 and a closed end 127, and tang 123, which when fully received in socket 122, is in a position 128 relative thereto. Socket 122 is provided with an internally screw-threaded bore 129 at closed end 127, the axis to this bore being at an acute angle to axis 121. Socket 122 has a first cylindrical clamping ring surface 130 at open end 126 and a second cylindrical clamping ring surface 134 at closed end 127. Tang 123 has a third cylindrical clamping ring surface 140 and a fourth cylindrical clamping ring surface 142 which respectively are aligned axially with first surface 130 and second surface 134 when the tang is fully received in the socket. These four cylindrical surfaces are then coaxially related along the axis 121. Tang 123 has a bore 150 extended through it and disposed for axial alignment with bore 129 when fin 115 and hub 120 are in their predetermined angular relation. A bolt 160 is extended through tang bore 150. This bolt has a screw-threaded end portion 161 which is adapted to screw-threadably engage bore 129 and has a head 160 which is adjacent to fin 115 and is adapted for engagement to rotate bolt 160. Attachment 110 has a first clamping ring 171 at its surface 130, a second clamping ring 172 at its surface 134, a third clamping ring 173 at its surface 140, and a fourth clamping ring 174 at its surface 142. Attachment 110 thus has an axially outer pair 176 of such rings and has an axially inner pair 177 thereof. The rings at the cylindrical hub surfaces each have a cylindrical exterior surface 178 conforming to and engaged with the corresponding hub surface, while the rings at the cylindrical tang surfaces each have a cylindrical interior surface 179 conforming to and engaged with the corresponding tang surface. The rings of each pair, 176 and 177, have conforming and engaged frusto-conical surfaces 181 and 182 converging toward the closed end of the socket. The four rings 171 through 174 have base ends designated respectively by the numerals 186, 185, 188 and 187. The above-identified elements of attachment 110 are sufficiently similar in configuration and relation to the corresponding elements of attachment 10 that such elements of attachment 110 and their relations need not be further discussed.

It is seen from FIG. 4 that closed end 127 of socket 122 is a planar circular surface which is normal to axis 121 and has the same diameter as second clamping ring surface 134. This diameter is substantially the same as the smaller diameter of frusto-conical surface 181 of first clamping ring 171, and surface 134 extends thereto from closed end 127. Exterior cylindrical hub surface 130, which engages the exterior surface 178 of ring 171, is joined to surface 134 by an annular positioning surface 200 which is normal to axis 121 and which engages base 186 of ring 171 to position this ring along axis 121. Second clamping ring 172 is located along axis 121 by engagement of base 188 with the closed end 27 the socket 22.

Tang 123 has a planar annular surface 205 which, when the tang is in its position 128, is in approximate alignment axially with the open end 126 of the socket 122. Surface 205 has an inner diameter substantially equal to interior surface 179 of third clamping ring 173. The tang has a first cylindrical surface 206 having this same diameter and extended coaxially from annular surface 205 toward closed socket end 127 through third clamping ring 173, so that annular surface 205 serves to position the third clamping ring with its frusto-conical surface 182 engaged with the conforming surface 181 of the first clamping ring 171. Cylindrical surface 206 terminates at a coaxial, annular positioning surface 207 which is planar and extends radially of and normally to axis 121. Surface 207 is spaced substantially from base 187 of fourth clamping ring 174 in a direction oppositely thereof from frusto-conical surface 181 of second clamping ring 172. The inner diameter of positioning surface 207 is substantially equal to the diameter of tang surface 134 and is thus also substantially equal to the diameter of interior surface 179 of fourth clamping ring 174. Tang 123 has a second cylindrical surface 208 having the same diameter as the inner diameter of positioning surface 207 and, with surface 134, extended therefrom centrally of fourth ring 174 which is fitted to these cylindrical surfaces for slidable axial movement relative thereto.

Attachment 110 has a resilient Belleville spring 210, of well known cup shaped, annular configuration, extended between positioning surface 207 and base 187 of fourth clamping ring 174 and disposed in substantially coaxial relation thereto. It is apparent that, when tang 123 is fully received in socket 122, frusto-conical surfaces 181 and 182 of the outer pair 176 of clamping rings are firmly engaged A positioning surface, similar to the surface 207 but juxtapositioned to base surface 187 of fourth clamping ring 174 might not, due to tolerances in manufacture, firmly engage this base surface so that the fourth clamping ring would not firmly engage second clamping ring 172. However, with the described structure of attachment 110, Belleville spring 210 urges the fourth ring toward the second ring so that their respective frusto-conical surfaces are firmly engaged even though these surfaces are not firmly engaged by movement of tang 123 along axis 121 toward closed socket end 127 because of prior engagement of the frusto-conical surfaces of first clamping ring 171 and third clamping ring 173.

OPERATION

First Embodiment

The operation of attachment 10 is believed clearly apparent and is briefly reviewed at this point with reference to FIGS. 1, 2 and 3. With one of the fins 15 detached from body 13 of missile 12 as shown in FIG. 1, the tang 23 mounted on the one fin is aligned with the corresponding axis 21 and positioned thereabout so that the axis of bore 50 through the tang will be aligned with bore 29 and appropriate socket 22 when the tang is received in the socket. Such alighnment, of course, also serves to align tang keyway 46 with key 90. The tang is then inserted into the socket until, as seen with reference to FIG. 2, tang shoulder 58 engages the retaining ring 65. Since this ring is movable axially in groove 32, a slight additional movement of the tang urges the ring into engage ment with third clamping ring 73 so that axial clearances between engaging surfaces of these rings, first clamping ring 71, spacer 95 and clamping rings 72 and 74, and closed socket end 27 are taken up as the clamping rings 71 through 74 slide axially in relation to the corresponding surfaces 30, 34, 40, and 42.

Bolt 60 is then rotated in the appropriate direction to screw-threadably engage its portion 61 with socket bore 29 and draw bolt head 62 into engagement with tang surface 52. It is apparent that socket bore 29 is only engageable by bolt portion 61 when a fin 15 and its hub 20 are in their predetermined angular relation. Further rotation of the bolt in this direction urges tang 22 to move along axis 21 toward closed socket end 27 so that the tang shoulder 58, in turn, urges retaining ring 65 into engagement with second clamping ring 72 so that the tang exerts a clamping force on the retaining ring which urges this ring, the four clamping rings, 71 through 74, and the spacer 95 toward the closed socket end 27. It is apparent that the clamping force is transmitted successively from retaining ring 65 to third clamping ring 73, to first clamping ring 71, to spacer 95, to fourth clamping ring 74, to second clamping ring 72, and to the closed socket end 27. The frusto-conical surfaces 81 and 82 of the ring pairs 76 and 77 are thus firmly engaged so that the rings 71 and 72 are forcibly expanded against the hub surfaces 30 and 34 and so that rings 73 and 74 are forcibly contracted respectively against tang surfaces 40 and 42 so that tang 23 and a fin 15 thereon are fixedly positoned along and angularly about axis 21 in relation to hub 20. It is apparent that bolt 60 is selectively engageable with socket 22 and rotatable in the one direction to attach the fin to the missile body 13. Although clamping rings 71 through 74 and bolt 60, in conjunction with the hub bore 29, serve to affix the fin to the hub in such relation, more precise angular pivotal positioning is obtainable by use of key 90, which is received in tang keyway 46 and in hub keyway 38.

When it is desired to detach one of the fins 15 from the missile body 13, the corresponding bolt 60 is rotated in the opposite direction from the direction for attaching the fin until the clamping forces between frustoconical surfaces 81 and 82 of clamping ring pairs 76 and 77 are relieved. The fin 15 and the tang 23 are thus released from body 13 so that tang 23 is removable from socket 22. When the tang is removed from the socket, key 90 is conveniently detachable therefrom by loosening the screw 92. The four clamping rings 71 through 74 and spacer 95 may then be conveniently removed from socket 22 for maintenance after removal of retaining ring 65.

Second Embodiment

The operation of attachment 110 of the second embodiment is apparent from FIGS. 1 and 4 and is similar to that of attachment 10 of the first embodiment in that bolt 160 is selectively rotatable for detaching tang 123 from socket 122 and for attaching the tang to the socket by movement of the tang along the axis 121 to expand rings 171 and 172 and to contract rings 173 and 174. With the second embodiment the clamping force exerted by the bolt 160 is, however, transmitted directly by tang surface 205 to rings 171 and 173 and is transmitted by Belleville spring 210 to rings 172 and 174.

Obviously many modifications and variations of the present invention are possible in light of the above teachings. It is, therefore, to be understood that within the scope of the appended claims the invention may be practiced otherwise than as specifically described.

What is claimed is:

1. An improved fin attachment for use with a missile having a fin and a body providing a skin, the attachment comprising:
    A. a hub mounted on the body and having an interior surface circumscribing a line extending through the skin, the hub having an open accessible end disposed at the skin and an opposite closed end disposed inwardly of the skin, and the fin being mounted on the hub in a predetermined pivotal position relative thereto about said line;
    B. a projection fixedly mounted on the fin, the projection being receivable within the interior surface by insertion through said open end along said line;
    C. one clamping ring circumscribing said line, said one ring having an outer surface fitted to said interior surface and an interior frusto-conical surface converging toward said closed end;
    D. another clamping ring circumscribed by said one ring and having an exterior frusto-conical surface conforming to the interior surface of said one ring and an inner surface fitted to said projection.
    E. means for positioning said one ring at a predetermined position along said line;
    F. means for positioning said another ring along said line with the frusto-conical surface thereof engaged with the frusto-conical surface of said one ring when the projection is received within said interior surface; and G. means extending from the projection for engagement with the hub at said closed end for urging the projection along said line toward said closed end, when the frusto-conical surfaces are engaged, to forcibly expand said one ring against the hub and forcibly contract said another ring onto the projection and so as to fixedly position the projection and the fin along and angularly about said line in relation to the hub.

2. The attachment of claim 1:

wherein the fin mounts on the hub with the fin extended from the body along said line;

wherein the projection has a first surface disposed toward said closed end of the hub, an opposite second surface from which the fin extends, and a bore extended through the projection in angular relation to said base, the bore having a first open end disposed at said first surface of the projection and a second open end disposed at said second surface thereof to one side of the fin;

wherein the hub has an internally screw threaded bore which is aligned axially with said bore of the projection when the projection is received in the interior surface with the fin in said predetermined position relative to the hub; and wherein the means for urging the projection along said base includes a bolt extending through the bore of the projection, the bolt having an externally screw-threaded end extended from the first surface of the projection and screw threadably engageable with the internally screw threaded bore of the hub and having a head engageable with a rotational driving tool and disposed to engage the second surface of the projection at said one side of the fin so that the bolt is rotatable in one direction to attach the fin to the body and is rotatable in the opposite direction to release the fin from the body.

3. The attachment of claim 1 wherein:

said one clamping ring is freely slidable in a direction along said line in relation to said interior surface when not expanded thereagainst, and said another clamping ring is freely slidable in relation to the projection when not contracted thereagainst;

the hub defines an annular groove extended outwardly from the interior surface and opening theretoward, the groove being disposed between said accessible end of the hub and said predetermined position of said one ring;

the attachment further comprises a retaining ring received in the groove and moveable in said direction within the groove, the retaining ring defining an opening centrally thereof for insertion of the projection and being engageable with said another clamping ring in a direction along said line so that said another clamping ring is retained by the retaining ring within said interior surface and retains said one clamping ring therein by engagement of the frusto-conical surfaces when the projection is withdrawn from said interior surface;

said means for positioning said another ring includes a shoulder defined by said projection and disposed to engage the retaining ring oppositely of said another ring to urge the retaining ring into engagement therewith as the projection is urged toward said closed end by said urging means; and said retaining ring having a thickness in a direction along said line less than the width of the groove in said direction such that, when the projection is so urged toward said closed end, the retaining ring is moveable axially in said groove into such engagement with said another ring.

4. An attachment for detachably connecting a first member to a second member with the members in a predetermined angular relation, the attachment comprising:

A. a generally circular socket defined by the second member and disposed in circumscribing relation to a predetermined axis, the socket having an open end and an opposite, closed axial end and the socket providing a first cylindrical surface of the attachment adjacent to the open end and a second cylindrical surface of the attachment adjacent to the closed end, the axes of said cylindrical surfaces being substantially coincident with said predetermined axis;

B. a tang extended from the first member and fixedly connected thereto, the tang being configured for reception in the socket at a predetermined position relative thereto along said predetermined axis when inserted through said open end in a direction along said axis toward said closed end, the tang bearing a third cylindrical surface of the attachment and a coaxial fourth cylindrical surface thereof which, respectively, are smaller in diameter than said first cylindrical surface and said second cylindrical surface by respective predetermined distances and which are aligned respectively therewith along said axis when the tang is received in the socket at said predetermined position, and the tang defining a channel extended therethrough and disposed in angular relation to said predetermined axis when the tang is received in the socket;

C. a first pair of concentric clamping rings, which has an outer ring providing an outer cylindrical surface freely slidably fitted to said first cylindrical surface and an inner ring providing an inner cylindrical surface freely slidably fitted to said third cylindrical surface, and a second pair of concentric clamping rings, which has an outer ring providing an outer cylindrical surface freely slidably fitted to said second cylindrical surface and an inner ring providing an inner cylindrical surface freely slidably fitted to said fourth cylindrical surface, each outer ring of said pairs having an inner frusto-conical surface which converges toward said closed end of the socket and each inner ring of said pairs having an outer frusto-conical surface conforming to the frusto-conical surface of the corresponding outer ring, said predetermined distances being such that said pairs of rings are receivable between the corresponding said cylindrical surfaces;

D. means for positioning the outer rings along said predetermined axis with the outer surface of the outer ring of said first pair aligned with said first cylindrical surface and with the outer surface of the outer ring of said second pair aligned with said second cylindrical surface and for positioning the innner rings along said axis with the inner surface of the inner ring of said first pair aligned with said third cylindrical surface and with the inner surface of the inner ring of said second pair aligned with said fourth cylindrical surface;

E. tension means, which extends through said channel, for moving the tang along said predetermined axis toward said closed end of the socket when the tang is received therein so as to firmly engage the frusto-conical surfaces of the rings of each pair, the tension means having a socket engaging portion, which is extended from the tang toward said closed end of the socket, and having a portion, which is disposed oppositely of the tang therefrom and which is manipulatable to urge the tang toward said closed end; and F. means disposed at said closed end for engagement by the socket engaging portion of the tension means only when the first member and the second member are in said predetermined angular relation.

5. The attachment of claim 4 wherein one of said clamping rings of one of said pairs thereof has an axial end corresponding axially to the larger diameter portion of the frusto-conical surface of said one ring, wherein the means for positioning the rings includes a positioning surface extending radially of said predetermined axis oppositely of said axial end from the frusto-conical surface of the other ring of said one pair, and wherein the attachment includes resilient means extending between said positioning surface and said axial end for urging said one clamping ring from the positioning surface firmly into engagement with said other clamping ring although the frusto-conical surfaces are not firmly engaged by movement of the tang along said predetermined axis by the tension means.

6. The attachment of claim 4 wherein each of the clamping rings has a base corresponding to the smaller diameter end of the frusto-conical surface thereof, and wherein the ring positioning means includes a surface of the socket adjacent to the closed end thereof and disposed to engage the base of the outer ring of the second pair to position said outer ring; a positioning surface of the tang extended radially of said axis oppositely of the base of the inner ring of said first pair from the outer ring thereof to position said inner ring; and a tubular spacer extended axially between the base of the outer ring of said first pair and the base of the inner ring of said second pair, the spacer being engageable oppositely by said outer ring and said inner ring to position said outer ring axially in relation to said inner ring; the spacer circumscribing the tang and being circumscribed by the socket; and the spacer being freely moveable axially relative to the socket and the tang when not engaged by said outer ring and said inner ring.

7. The attachment of claim 6 wherein:
the socket provides an annular groove coaxially related to the inner ring of said first pair and extended axially from the base of said inner ring toward the ope end of the socket;
the coupling further comprises a retaining ring which defines a central circular opening having a diameter less than the outer diameter of the base of said inner ring and which is received peripherally in said groove, the retaining ring being moveable axially in said groove into engagement with said base; and
said positioning surface of the tang is an annular shoulder disposed to engage the retaining ring oppositely of said inner ring and urge the retaining ring, the first pair of clamping rings, the spacer, and the second pair of clamping rings toward the closed end of the socket when the tang is inserted therein and moved toward the closed end thereof by said tension means.

8. The attachment of claim 4 wherein the tang is of tapered configuration converging axially in direction from the third cylindrical surface toward the fourth cylindrical surface and the tang defines a keyway extending axially thereof between said cylindrical surfaces and opening radially, outwardly from said axis, the keyway being disposed radially outwardly of the fourth cylindrical surface and opening along said axis in a direction toward said fourth surface, and wherein the attachment further comprises a key fixedly mounted on the socket and extended therefrom for reception in the keyway as the tang moves toward said closed end of the socket when said members are in said predetermined angular relation, the keyway being spaced from said axis a distance greater than the radius of said fourth surface so that the tang is removeable from the socket and is insertable therein while the key and the second pair of clamping rings remain in the socket.

9. An attachment for detachably connecting a pair of members disposed in juxtapositioned relation along a predetermined axis, the attachment comprising a socket defined in one of said members and circumscribing said axis and a tang extended along said axis from the other of said members, the socket having an axially open end and an opposite, axially closed end and the tang being configured for insertion into the socket through said open end in a direction along said axis toward said closed end and for removal from the socket by movement in the opposite direction; the socket having an outer end cylindrical surface adjacent to said open end and an inner end cylindrical surface adjacent to said closed end and the tang having an outer end cylindrical surface and inner end cylindrical surface, said outer end surfaces being aligned along said axis and said inner end surfaces being aligned along said axis when the tang is so received and the axes of, said outer surfaces and said inner surfaces being substantially coincident with said predetermined axis when the tang is so received; the attachment including an outer pair of clamping rings disposed between said outer surfaces when the tang is so received and an inner pair of clamping rings disposed between said inner surfaces when tang is so received, each pair of said rings having one ring circumscribing the other ring and the rings of each pair being engaged along a pair of conforming frusto-conical surfaces individual thereto and converging toward the axially closed end of the socket, said one ring having an outer cylindrical surface conforming to and slidably engaged with the corresponding cylindrical surface of the socket and said other ring having an inner cylindrical surface conforming to and slidably engageable with the corresponding cylindrical surface of the tang; said other ring of the outer pair of rings bearing a first axial end surface disposed toward the open end of the socket, said one ring of the outer pair of rings bearing a second axial end surface disposed toward the closed end of the socket, said other ring of the inner pair of rings bearing a third axial end surface disposed toward said open end, and said one ring of the inner pair of rings bearing a fourth axial end surface disposed toward said closed end and engaged therewith; the attachment including a tubular spacer coaxially related to said cylindrical surfaces of said rings and having an inner axial end engageable with said third surface and an outer axial end engageable with said second surface, the spacer being disposed within the socket and being disposed externally of the tang when the tang is received in the socket and the spacer being freely moveable along said axis in relation to the tang and to the socket when the tang is so received and the spacer is not restrained by engagement with said third surface and with said second surface; the socket having an annular groove opening centrally of the socket, said groove being coaxially related to said first end surface and aligned axially therewith; the attachment including a retaining ring received in said annular groove for movement axially therein toward and from said first surface, the retaining ring being resilient and radially compressible for insertion through said open end and subsequent expansion into said annular groove with the ring extending from the groove radially into the socket, the retaining ring providing, when received in said groove, one axially disposed surface facing the open end of the socket and an opposite axially disposed surface which faces said first axial end surface of said other clamping ring of said outer pair for engagement with said other ring so as, when the tang is remote from the socket, to retain said other clamping ring of the outer pair in the socket together with said one clamping ring of the outer pair, the spacer, and the clamping rings of said inner pair; the tang having a portion which bears said cylindrical surfaces thereof and which extends centrally through the retaining ring without engagement therewith when the tang is inserted in the socket through said open end, and the tang having an annular clamping surface extended radially from said portion of the tang so as to engage said one axially extended surface of the retaining ring when the tang is received in the socket; and the attachment having tension means extending from the tang and being selectively engageable with the socket for drawing the tang toward said closed end of the socket to exert a clamping force on the retaining ring by engagement of the clamping surface of the tang therewith, said force being transmitted successively from the retaining ring to said other clamping ring of said outer pair, to said one clamping ring of said pair, to the spacer, to said other ring of said inner pair, to said one ring of said inner pair, and to the closed end of the socket and being selectively releasable from the socket for removal of the tang therefrom.

10. The attachment of claim 9 wherein said pair of member has a predetermined angular relation about said axis and the socket defines a keyway which opens centrally of the socket between said pairs of clamping rings; the spacer defines an opening therethrough, which, radially of said axis, conforms to the keyway and is aligned therewith; the tang defines a keyway which is aligned with the keyway of the socket and opens theretoward when said members are in said predetermined angular relation, and wherein the coupling further comprises a key which is disposed in the keyway of the socket and is fixedly mounted thereon and which extends centrally of the socket through said opening and into the keyway of the tang when the tang is received in the socket, the outer cylindrical surface of the tang being larger in diameter than the inner cylindrical surface thereof and the tang extending from the socket to a position inwardly of said outer cylindrical surface of the tang and outwardly of said inner cylindrical surface thereof so that the tang is removable from the socket while the key remains fixed on the socket.

11. The attachment of claim 10 further comprising means for releasably mounting the key on the socket.

* * * * *